United States Patent [19]

Foster et al.

[11] Patent Number: 5,003,023
[45] Date of Patent: Mar. 26, 1991

[54] OLEFIN POLYMER COMPOSITIONS CONTAINING POLYORGANOSILOXANES AND THE USE THEREOF IN THE PRODUCTION OF FILM MATERIAL AND POLYORGANOSILOXANES

[75] Inventors: George N. Foster, Bloomsbury, N.J.; Herbert E. Petty, Bethel, Conn.; Charles H. Blevins, II, Beacon; Roswell E. King, III, Pleasantville, both of N.Y.

[73] Assignees: Union Carbide Chemicals; Plastics Technology Corporation, both of Danbury, Conn.

[21] Appl. No.: 497,592

[22] Filed: Mar. 22, 1990

Related U.S. Application Data

[60] Division of Ser. No. 322,968, Mar. 17, 1989, Pat. No. 4,931,492, which is a continuation-in-part of Ser. No. 176,051, Mar. 31, 1988, abandoned, and Ser. No. 176,090, Mar. 31, 1988, abandoned.

[51] Int. Cl.$^5$ ............................................. C08G 77/04
[52] U.S. Cl. ...................................... 528/28; 528/29; 528/38; 556/425; 556/449
[58] Field of Search ................... 556/425, 449; 528/28, 528/29, 38

[56] References Cited

U.S. PATENT DOCUMENTS

| | | | |
|---|---|---|---|
| 4,130,708 | 12/1978 | Friedlander et al. | 556/449 |
| 4,294,974 | 10/1981 | Le Bourf | 556/449 |
| 4,722,951 | 2/1988 | Yoshioka et al. | 524/266 |
| 4,740,575 | 4/1988 | Nguyen et al. | 528/28 |
| 4,931,492 | 6/1990 | Foster et al. | 525/106 |

*Primary Examiner*—Melvyn I. Marquis
*Attorney, Agent, or Firm*—William F. Gray

[57] ABSTRACT

The present invention relates to olefin polymer compositions which can be extruded into film material characterized by improved stability and optical properties. In particular, this application is directed olefin polymer compositions containing specific polyorganosiloxanes bearing a hydroxyl functionality.

9 Claims, No Drawings

OLEFIN POLYMER COMPOSITIONS CONTAINING POLYORGANOSILOXANES AND THE USE THEREOF IN THE PRODUCTION OF FILM MATERIAL AND POLYORGANOSILOXANES

This application is a division of prior U.S. application Ser. No. 322,968, filed Mar. 17, 1989, now U.S. Pat. No. 4,931,492, which is a continuation-in-part of application Ser. No. 176,081, filed Mar. 31, 1988 and Ser. No. 176,090 filed Mar. 31, 1988, now both abandoned.

FIELD OF THE INVENTION

The present invention is directed to olefin polymer compositions which can be extruded into a film which exhibits improved stability and optical properties. In particular, the present invention is directed to olefin polymer compositions containing polyorganosiloxanes which have hydroxyl functionality, and the polyorganosiloxanes per se.

BACKGROUND OF THE INVENTION

It is well known that residues from the polymerization of alpha olefin polymers using Ziegler-Natta catalysis show adverse effects on both stability and product color of films in which they are found. Increased amounts of stabilizers are needed to off-set such deleterious effects from the catalyst residue. The adverse interactions typically result, in part, from the reactions of transition metal residues with phenolic antioxidants or their breakdown products. Chloride residues can react with the phenolic antioxidants catalyzinq dealkylation and promoting autoxidation. Further, phenolate salts or coordination complexes can form that are chromophores.

The industry wide approach has been to add metallic stearates of zinc, magnesium, and/or calcium as acid acceptors with the phenolic antioxidants. However, the use of metallic stearates can cause plateout or die lip buildup problems. They can also interfere with heat sealing and ink adhesion.

Certain polyols such as glycerol, sorbitol, or pentaerythritol, or their mono esters with fatty acids, have also been reported to give additional color improvements.

The polyols are not always found to have a positive effect on color improvement. The variable effectiveness of the polyols may be, in part, due to their solubility limitations and their inability to reach the catalyst residue.

Ultrafine zinc oxide or hydrotalcite (a hydrate of magnesium carbonate/aluminum hydroxide) can be used to replace the metallic stearates. However the use of these inorganic materials can give rise to dispersion problems. Moreover, such inorganic neutralizers by themselves or when wetted with small amounts of metallic stearate are not effective in controlling discoloration.

It is therefore an object of the present invention to provide a polyolefin composition which exhibits stability against the deleterious effects normally caused by catalyst residues present therein.

It is further an object of the present invention to provide a polyolefin composition which exhibits improved optical properties.

It has been found that the objects of the present invention are achieved by incorporation into polyolefin compositions of specific polyorganosiloxanes bearing hydroxyl functionality.

The use of polyorganosiloxanes as additives in polymer compositions is generally known. For instance, U.S. Pat. No. 3,879,491 discloses the production of thermoplastic compositions containing from 1 to 15 weight percent of a hydroxy end blocked polydiorganosiloxane. U.S. Pat. No. 4,430,235 discloses polydiorganosiloxane based polymeric antioxidants, such as

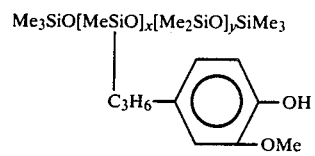

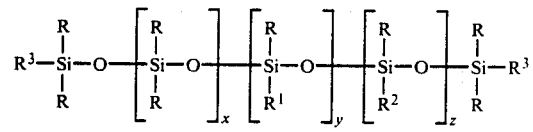

wherein Me represents a methyl group. U.S. Pat. No. 4,535,113 discloses polyolefin compositions having improved optical properties containing polydiorganosiloxanes bearing ethylene oxide, vicinal epoxy, or amino functionalities.

SUMMARY OF THE INVENTION

The present invention is directed to a polyorganosiloxane and composition comprising an olefin polymer and the polyorganosiloxane. The polyorqanosiloxane has the following nominal formula:

$$R^3-\underset{R}{\underset{|}{Si}}-O-\left[\underset{R}{\underset{|}{Si}}-O\right]_x\left[\underset{R^1}{\underset{|}{Si}}-O\right]_y\left[\underset{R^2}{\underset{|}{Si}}-O\right]_z\underset{R}{\underset{|}{Si}}-R^3$$

wherein
R, which may be the same or different, represents an alkyl group having from 1 to 4 carbon atoms;
$R^1$ represents the group $-R4-(N)_b-(O)_c-R^5$;
$R^2$ represents the group $-(CH_2)_d-R$ wherein R is as previously defined;
$R^3$, which may be the same or different, represents R or $R^2$;
$R^4$ represents a straight or branched chain alkylene group having 1 to 15 carbon atoms;
$R^5$ represents hydrogen; $(CH_2)_aCHOHCH_2OH$; or $[(CH_2)_eOH]_fH_{2-f}$;
a is an inteqer having a value of 1 to 15;
b has a value of 0 or 1;
c has a value of 0 or 1;
d is an integer having a value of 3 to 50;
e has a value of 1 or 2;
f has a value of 1 or 2;
x has a value ranging from about 1 to about 200;
y has a value ranging from about 1 to about 200; and
z has a value ranging from 0 to about 200; with the proviso that:
if $R^5$ is hydrogen or $(CH_2)_aCHOHCH_2OH$, b is 0 and c is 1; and
if $R^5$ is $[(CH_2)_eOH]_fH_{2-f}$, b is 1 and c is 0.

DETAILED DESCRIPTION OF THE INVENTION

The present invention provides polyolefin compositions containing olefin polymers and polyorqanosiloxanes having hydroxyl functionality, which can be extruded into a film which is characterized by improved stability and optical properties, as well as the polyorganosiloxanes themselves.

The polyorganosiloxanes useful in the practice of the present invention have the following nominal formula:

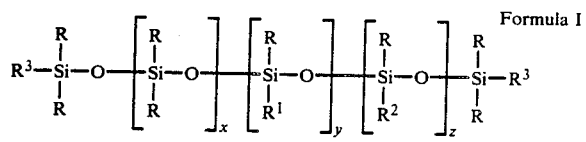

Formula I wherein
R, which may be the same or different, represents an alkyl group having from 1 to 4 carbon atoms;
$R^1$ represents the group $-R^4-(N)_b-(O)_c-R^5$;
$R^2$ represents the group $-(CH_2)_d-R$ wherein R is as previously defined;
Rhu 3, which may be the same or different, represents R or $R^2$;
$R^4$ represents a straight or branched chain alkylene group having 1 to 15 carbon atoms;
$R^5$ represents hydrogen; $(CH_2)_aCHOHCH_2OH$; or $[(CH_2)_eOH]_fH_{2-f}$;
a is an integer having a value of 1 to 15;
b has a value of 0 or 1;
c has a value of 0 or 1;
d is an integer having a value of 3 to 50;
e has a value of 1 or 2;
f has a value of 1 or 2;
x has a value ranging from about 1 to about 200;
y has a value ranging from about 1 to about 200 and
z has a value ranging from 0 to about 200; with the proviso that:
if $R^5$ is hydrogen or $(CH_2)_aCHOHCH_2OH$, b is 0 and c is 1; and
if $R^5$ is $[(CH_2_eOH]_fH_{2-f}$, b is 1 and c is 0.

Preferably, R represents a methyl group.

Preferably x has a value ranging from about 5 to about 20. Preferably y has a value ranginq from about 5 to about 20. Preferably z has a value ranging from 0 to about 20. Furthermore, it is preferred that x/y has a value of from about 1 to about 9 and z/x has a value of from 0 to about 1.

Preferably, a has a value of from about 3 to about 12.

Most preferred compounds for use in the practice of the claimed invention are compounds wherein R' is:
$-R^4-OH$, wherein a is as previously defined;
$-R^4-N-(CH_2CH_2-OH)_2$, wherein a is as previous defined;
$-R^4-NH-CH_2OH$; and
$-R^4-O-(CH_2)_aCHOHCH_2OH$.

Specific compounds among those most preferred polyorganosiloxane compounds for use in the practice of the claimed invention are compounds wherein:
(1) x=15, y=5, z=0, $R^1=-(CH_2)_3-OH$;
(2) x=13, y=5, z=0, $R^1=-(CH_2)_3-OH$;
(3) x=10, y=10, z=0, $R^1=-(CH_2)_3-OH$;
(4) x=15, y=5, z=0, $R^1=-(CH_2)_3-N(C_2H_4OH)_2$;
(5) x=13, y=5, z=0, $R^1=-CH_2-CH(CH_3)-CH_2OH$;
(6) x=10, y=5, z=5, $R^1=-(CH_2)_3-OH$, $R^2=-(CH_2)_{11}-CH_3$ and is pendant;
(7) x=10, y=5, z=0, $R^1=-CH_2-O-CH_2-CHOH-CH_2OH$; and
(8) x=13, y=5, z=0, $R^1=-(CH_2)_3-O-CH_2-CHOH-CH_2OH$.

The polyorganosiloxanes of the present invention can be prepared by means well known to those skilled in silicone chemistry. For example, the precursor of the polysiloxanes of this invention, has the nominal formula:

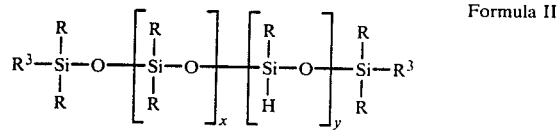

Formula II wherein the variables are as previously defined and can be conveniently prepared by reacting a mixture containing hexamethyldisiloxane, octamethylcyclotetrasiloxane, trimethyl end blocked methyl hydrogen polysiloxane, and an acid catalyst. The number of repeating units can be varied, as desired, by varying the mole ratio of the reactants. A specific procedure for preparing a precursor falling within the scope of the above formula is set forth in Example 2 of U.S. Pat. No. 4,046,930 granted Sept. 6, 1977. The precursor of Formula II is then reacted with an alpha olefin of various chain lengths containing the terminal functionality necessary to produce the group denoted by $R^1$ as herein defined. If z is to have a value greater than zero, also present in the reaction should be an alpha-olefin having from about 4 to about 50 carbon atoms to produce a polysiloxane having a functionalty represented as $R^2$ in Formula I. The ratio of $R^1$ to $R^2$ groups, expressed as subscripts y and z as set forth in Formula I, may be varied through variation of the molar ratios of the hydroxy-substituted alpha-olefin and the unsubstituted alpha olefinic reactants described above. This reaction may be conducted in the presence of a platinum catalyst such as chloroplatinic acid. Where z is 0, and $R^3$ is $R^2$, the group $-(CH_2)_d-R$ can be added as an end group.

Olefin polymers suitable for use in this invention are normally solid materials and include homopolymers of olefins as well as interpolymers of one or more olefins with each other and/or up to about 30 percent by weight of one or more monomers which are copolymerizable with such olefins. Homopolymers and interpolymers of such olefins as ethylene, propylene, butene-1, isobutylene, hexene-1, 4-methyl-pentene-1, pentene-1, octene-1, nonene-1, and decene-1, as well as interpolymers of one or more of such olefins and one or more of other monomers which are interpolymerizable with such alpha-olefins, such as vinyl and diene compounds, are suitable for the purposes of this invention.

Exemplary interpolymers are ethylene copolymers such as ethylene propylene copolymers, ethylene-butene-1 copolymers, ethylene-hexene-1 copolymers, ethylene-octene-1 copolymers, polymers of ethylene and two or more of the following compounds: propylene, butene-1, hexene-1, 4-methyl-pentene 1, octene-1, and the like.

Also included in the term olefin polymer are blends of one polymer with one or more other polymers. Illustrative of such blends are the ethylene/olefinic polymers with one or more of the following: polypropylene; high pressure, low-density polyethylene; high density polyethylene; polybutene-1, and polar monomer containing olefin copolymers such as ethylene/acrylic acid copolymers; ethylene/methyl acrylate copolymers; ethylene/ethyl acrylate copolymers; ethylene/vinyl acetate copolymers; ethylene/acrylic acid/ethyl acrylate terpolymers, ethylene/acrylic acid/vinyl acetate terpolymers, and the like.

Preferred ethylene polymers for purposes of this invention are low pressure, substantially linear ethylene homopolymers and ethylene —$C_3$ to $C_8$ alpha olefin interpolymers having a density of about 0.850 to about 0.970, preferably about 0.875 to about 0.930. These interpolymers can be prepared by reacting a mixture containing about 50 to 99.9 mole percent, preferably about 75 to 96 mole percent ethylene and from about 0.1 to 50 mole percent and preferably about 4 to about 25 mole percent of one or more $C_3$ to $C_8$ alpha olefins such as propylene, butene-1, pentene-1, 4 methyl-pentene 1, hexene-1. heptene 1. octene-1 and the like, usinq a magnesium chloride/titanium chloride catalyst and employing low pressures on the order of about 15 to 300 psi as disclosed in U.S. Pat. No. 4,302,565.

Particularly preferred olefin polymers are ethylene/butene 1 copolymers containing up to 30 weight percent butene-1; ethylene/hexene-1 copolymers containing up to 30 weight percent hexene-1; said copolymers additionally based on up to 10 weight percent of propylene comonomer; ethylene/propylene copolymer containing up to 60 weight percent, propylene; and ethylene/propylene/ diene terpolymer containing up to 50 weight percent propylene and up to 12 weight percent diene such as ethylidene norbornene.

The polysiloxanes of Formula I are added to the olefin polymers in amounts sufficient to improve the stability and/or optical properties of the final olefin compositions. As a general rule, the amounts of polyorganosiloxanes used in the practice of the present invention range from about 0.005 to about 0.5 percent by weight, preferably about 0.02 to about 0.05 percent by weight, based on the total weight of the final olefin polymer composition.

The admixture of the polyorganosiloxanes of Formula I and olefin polymers can be conveniently effected in a suitable mixer such as a Banbury mixer.

To the compositions of this invention can be also added various materials commonly added to extrudable compositions. These materials include additives such as fillers, e.g., $Mg(OH)_2$ in amounts up to 60 weight percent of the final olefin polymer composition; calcium carbonate; and talc; colorants, e.g., $TiO_2$ and carbon black; pigments other than $TiO_2$; lubricants; slip agents; antioxidants; and antiblock agents, in amounts well known in the art.

Whereas the exact scope of the instant invention is set forth in the appended claims, the following specific examples are provided to further illustrate certain aspects of the present invention. These examples are set forth for illustration only and are not to be construed as limitations on the present invention. All parts and percentages are by weight unless otherwise specified.

The patents mentioned in this specification are incorporated by reference herein.

EXAMPLES

Experimental results are presented in Tables I to IV. In all Examples, the additives were dry blended into the granular polyethylenes as hereinafter defined. The test compositions were than extruded using a Brabender® tape extruder at 200 degrees Celsius. Melt index, flow index, yellowness index, and differential scanning calorimetric induction times were then determined.

DEFINITIONS

Polyolefin A represents an ethylene/1 -butene copolymer composition containing a catalyst composition within the scope of U.S. Pat. No. 4,508,842.

Polyolefin B represents a polyethylene composition containing a catalyst composition within the scope of U.S. Pat. No. 4,302,566.

Polyolefin C represents a polypropylene composition containing a catalyst composition within the scope of U.S. Pat. No. 4,302,566.

PS A (polyorganosiloxane A) represents a polyorganosiloxane of Formula I wherein x has a value of 15; y has a value of 5; z has a value of 0; R represents methyl; $R^1$ represents —$(CH_2)_3$—OH; and $R^3$ represents methyl.

PS B (polyorganosiloxane B) represents a polyorganosiloxane of Formula I wherein x has a value of 10; y has a value of 10; z has a value of 0; R represents methyl; and $R^1$ represents —$(CH_2)_3$—OH; and $R^3$ represents methyl.

Additive 1 represents octadecyl 3 -(3, 5 ditertbutyl-4 -hydroxy phenyl) propionate.

Additive 2 represents zinc stearate.

Additive 3 represents zinc oxide.

Additive 4 represents hydrotalcite.

Additive 5 represents tris-(2, 4 di-tert butyl phenyl) phosphite.

Additive 6 represents gylcerol monostearate.

Additive 7 represents triethanol amine.

Additive 8 represents a linear polymethysiloxane having about 200 dimethylsiloxane units.

Additive 9 represents gylcerol.

Additive 10 represents tetrakis[methylene (3,5-di-tert-butyl-4 -hydroxyhydrocinnamate)]methane marketed by Ciba-Geigy as Irganox® 1010.

Additive 11 represents distearyl thiodipropionate.

Additive 12 represents calcium stearate.

Yellowness Index was determined in accordance with ASTM D-1925-70. A Pacific Scientific Colorgard System® /05 instrument was used in the determination of color.

DSC-OIT represents Differential Scanning Calorimetry-Oxidative Induction Time as determined o on a DuPont Thermal Analyzer®. This measurement relates to oxidative stability of the polyolefin at elevated temperatures. DSC-OIT data varies directly with thermal oxidative stability of the polyolefin.

Melt Index, Flow Index and Melt Flow Ratio represent the melt viscosity of the polyolefin at a prescribed temperature under various pressure in accordance with ASTM D-1238 conditions E and F. Data was collected with the aid of a Tinius-Olsen Plastograph® instrument.

General Procedure

The procedure set forth below was used in the performance of the following Examples and Comparative Examples.

Each component was first diluted in a separate portion of the olefin polymer in a concentration of 5 weight percent to make a masterbatch. Use of the resulting masterbatch allowed for more accurate addition of the desired additives into the final resin composition. Accurately weighed portions of the respective masterbatches were then added to the balance of the resin. The resulting mixture was then shaken in a plastic bag for 5 minutes to ensure thorough mixing and dispersion.

Each resin mixture was then extruded with a Brabender Plasticorder® extruder fitted with a 1 inch extruder screw, a 25:1 length/diameter ratio and a 4 inch×0.125 inch steel tape die. All zones of the extruder, as well as the die, were heated to 200° C. prior to the performance of the balance of the procedure.

The extruder was then purged for 10 minutes at 50 rpm with additional quantities of the olefin resin followed by introduction of the experimental resin mixture. The resin sample was then extruded for a period of 5 minutes and collected as a 0.02 inch tape. The extruder was then purged with additional quantities of the olefin resin prior to the introduction of a subsequent experimental resin mixture.

TABLE I

| Compositions | | | | | | | |
|---|---|---|---|---|---|---|---|
| Polyolefin A | 100. | 99.98 | 99.93 | 99.82 | 99.93 | 99.91 | 99.91 |
| Additive 1 | — | 0.02 | 0.02 | 0.02 | 0.02 | 0.02 | 0.02 |
| Additive 2 | — | — | 0.05 | 0.05 | — | — | — |
| Additive 3 | — | — | — | — | — | 0.02 | 0.02 |
| Additive 4 | — | — | — | 0.05 | — | — | — |
| Additive 5 | — | — | — | 0.06 | — | — | — |
| PS A | — | — | — | — | 0.05 | 0.05 | — |
| PS B | — | — | — | — | — | — | 0.05 |
| Yellowness Index | 13. | 22. | 18. | 6.2 | 5.4 | 10. | 8.3 |
| DSC OIT @ 180° C., (min.) | 0.3 | 5.1 | 3.9 | 7.3 | 9.1 | 8.6 | 15.7 |
| Melt Flow Properties | | | | | | | |
| Melt Index, dg/min | 0.92 | 0.99 | 1.14 | 1.18 | 1.12 | 1.19 | 1.15 |
| Melt Flow Ratio | 68.0 | 65.0 | 61 | 59. | 60.0 | 58. | 60. |

TABLE II

| Compositions | | | | | | | | | |
|---|---|---|---|---|---|---|---|---|---|
| Polyolefin A | 100. | 99.97 | 99.92 | 99.92 | 99.92 | 99.92 | 99.92 | 99.92 | 99.87 |
| Additive 6 | — | — | — | 0.05 | — | — | — | — | — |
| Additive 7 | — | — | — | — | 0.05 | — | — | — | — |
| PS A | — | — | — | — | — | — | 0.05 | — | — |
| PS B | — | — | — | — | — | — | — | 0.05 | 0.05 |
| Additive 8 | — | — | 0.05 | — | — | — | — | — | — |
| Additive 2 | — | — | — | — | — | 0.05 | — | — | — |
| Additive 4 | — | — | — | — | — | — | — | — | 0.025 |
| Additive 3 | — | — | — | — | — | — | — | — | 0.025 |
| Additive 1 | — | 0.03 | 0.03 | 0.03 | 0.03 | 0.03 | 0.03 | 0.03 | 0.03 |
| Yellowness Index | 8.0 | 13. | 14. | 11. | 36. | 11. | 6.6 | 6.7 | 3.5 |
| DSC-OIT @ 190° C. (min.) | <0.5 | 2.5 | — | — | — | — | 9.1 | 11. | — |

TABLE III

| Compositions | | | | | | | | | |
|---|---|---|---|---|---|---|---|---|---|
| Polyolefin B | 100. | 99.97 | 99.95 | 99.95 | 99.95 | 99.92 | 99.92 | 99.92 | 99.87 | 99.81 |
| Additive 9 | — | — | — | 0.05 | — | — | — | — | — | — |
| Additive 7 | — | — | — | — | 0.05 | 0.05 | — | — | — | — |
| PS A | — | — | 0.05 | — | — | — | 0.05 | — | — | — |
| PS B | — | — | — | — | — | — | — | 0.05 | — | 0.05 |
| Additive 2 | — | — | — | — | — | — | — | — | — | 0.05 |
| Additive 4 | — | — | — | — | — | — | — | — | 0.025 | 0.05 |
| Additive 3 | — | — | — | — | — | — | — | — | 0.025 | — |
| Additive 1 | — | 0.03 | — | — | — | 0.03 | 0.03 | 0.03 | 0.03 | 0.03 |
| Additive 5 | — | — | — | — | — | — | — | — | — | 0.06 |
| Yellowness Index | 3.2 | 14. | −3.6 | 2.4 | 24. | 15. | −1.0 | −1.8 | −2.4 | 5.6 |
| DSC-OIT @ 180° C. (min.) | <0.5 | 2.5 | — | — | — | — | 9.1 | 11. | — | — |

TABLE IV

| Compositions (pct.) | | | | |
|---|---|---|---|---|
| Polyolefin C | 99.63 | 99.68 | 99.73 | 100. |
| Additive 1 | 0.1 | 0.1 | 0.1 | — |
| Additive 11 | 0.2 | 0.1 | — | — |
| Additive 12 | 0.07 | 0.07 | 0.07 | — |
| PS A | — | 0.05 | 0.10 | — |
| Yellowness Index | 6.2 | 6.7 | 6.2 | 17. |
| DSC OIT, @ 180° C. (min.) | 8.6 | 15.0 | 15.2 | <0.5 |

As shown through the above Examples and Comparative Examples, the compositions of the present invention exhibit improved oxidation resistance and reduced color when compared to unstabilized polyolefin compositions. The compositions of the present invention further exhibit improved oxidation resistance and/or reduced color when compared to other stabilized polyolefin compositions.

We claim:

1. A polyorganosiloxane of the following nominal formula:

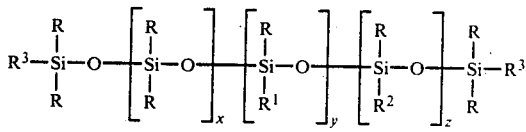

wherein
R, which may be the same or different, represents an alkyl group having from 1 to 4 carbon atoms;
$R^1$ represents the group $-R^4-N-[(CH_2)_eOH]_2$;
$R^2$ represents the group $-(CH_2)_d-4$ wherein R is as previously defined;
$R^3$, which may be the same or different, represents R or $R^2$;
$R^4$ represents a straight or branched chain alkylene group having 1 to 15 carbon atoms;
d is an integer having a value of 3 to 50;
e has a value of 1 or 2;
x has a value ranging from about 1 to about 200;
y has a value ranging from about 1 to about 200; and
z has a value ranging from 0 to about 200.

2. The polyorganosiloxane of claim 1 wherein R represents a methyl group, x has a value of from about 5 to about 20, y has a value of about 5 to about 20, and z has a value of 0 to about 20.

3. The polyorganosiloxane of claim 1 wherein R represents a methyl group, x/y has a value of from about 1 to about 9 and z/x has a value of from 0 to about 1.

4. The polyorganosiloxane of claim 1 wherein z is at least about one.

5. The polyorganosiloxane of claim 1 wherein the alkylene group has 2 to 12 carbon atoms.

6. The polyorganosiloxane of claim 5 wherein z is at least about one and d has a value of from 3 to 20.

7. The polyorganosiloxane of claim 1 wherein $R^1$ is $R_4-N-(CH_2CH_2OH)_2$.

8. The polyorganosiloxane of claim 1 wherein z is 0; R is methyl; and at least one $R^3$ is $R^2$.

9. The polyorganosiloxane of claim 1 wherein R and $R^3$ are methyl and z is at least about one.

* * * * *